United States Patent [19]

Lauer et al.

[11] 4,024,329

[45] May 17, 1977

[54] METHOD FOR REMOVING HEAT FROM A CHEMICAL REACTION

[75] Inventors: Richard P. Lauer; Richard S. Rankl; Theodore H. Dehnke, all of Midland, Mich.

[73] Assignee: The Dow Chemical Company, Midland, Mich.

[22] Filed: July 3, 1975

[21] Appl. No.: 593,158

[52] U.S. Cl. .................................. 526/61; 526/67; 526/68

[51] Int. Cl.² .................. C08F 2/22; C08F 236/06; C08F 212/08

[58] Field of Search ............... 423/659; 526/68, 67, 526/61

[56] References Cited

UNITED STATES PATENTS

| | | | |
|---|---|---|---|
| 2,484,384 | 10/1949 | Levine et al. | 526/68 |
| 2,527,768 | 10/1950 | Schulze et al. | 526/68 |
| 2,925,319 | 2/1960 | Groll | 423/659 |
| 3,349,070 | 10/1967 | Thayer | 526/67 |
| 3,578,649 | 5/1971 | Badguerahanian et al. | 526/68 |
| 3,627,744 | 12/1971 | Hopkins et al. | 526/68 |
| 3,772,257 | 11/1973 | Bochum et al. | 526/68 |
| 3,794,471 | 2/1974 | Latinen et al. | 526/68 |

*Primary Examiner*—Alan Holler
*Attorney, Agent, or Firm*—V. Dean Clausen

[57] ABSTRACT

The method of this invention is particularly useful for removing heat from an exothermic reaction of a liquid medium. An example of such a reaction is an emulsion polymerization of styrene and butadiene to obtain a latex product. In this reaction the butadiene will boil at the temperature and pressure conditions in the reactor. Attached to the reactor is a condenser unit, which is basically a modified shell and tube heat exchanger. During the reaction the butadiene vapors are directed from the reactor into the tube bundle of the condenser unit through the top of the unit. In the condenser the butadiene vapors are condensed to a liquid, which flows downwardly into the reactor to cool the reaction mass.

1 Claim, 1 Drawing Figure

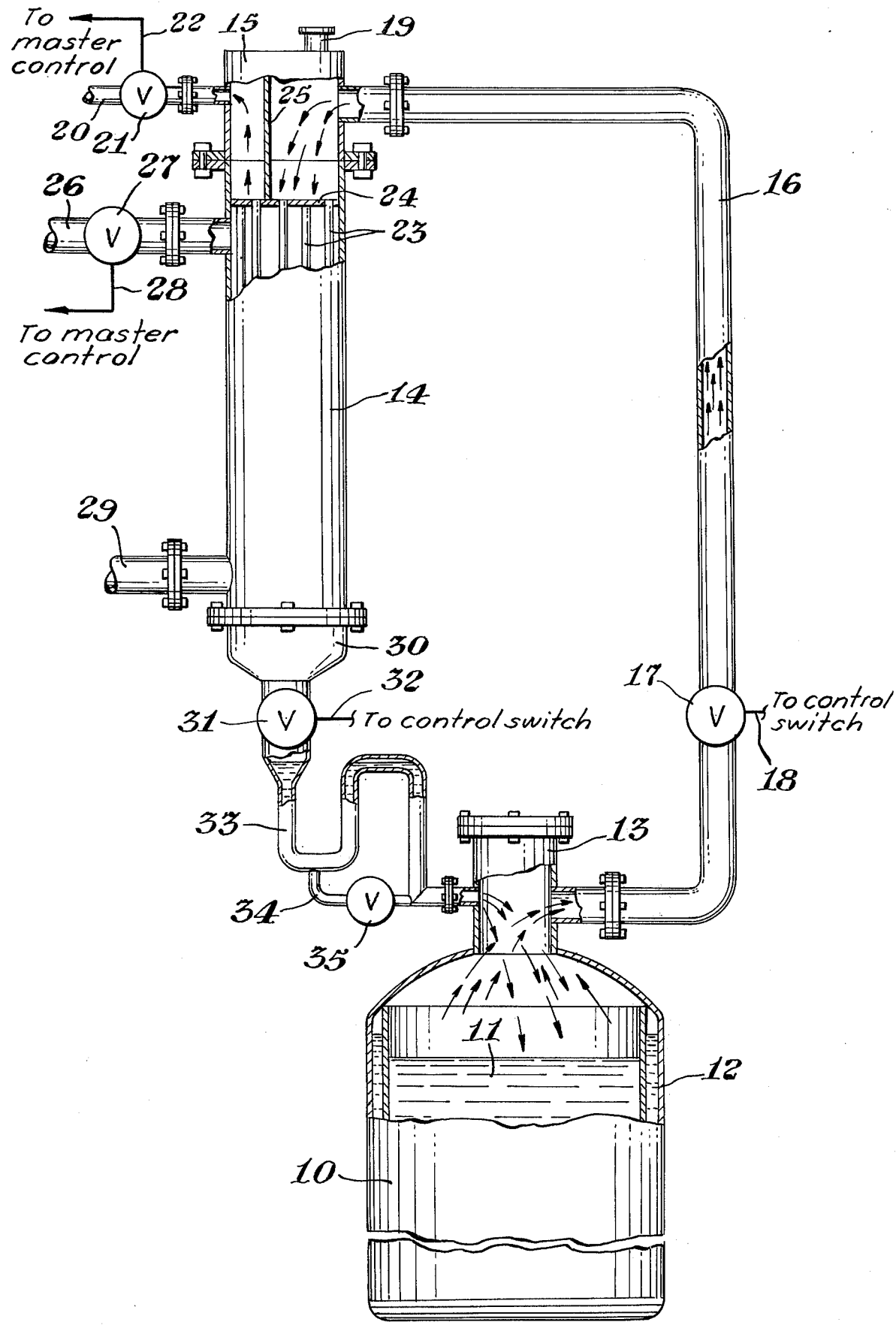

METHOD FOR REMOVING HEAT FROM A CHEMICAL REACTION

BACKGROUND OF THE INVENTION

The invention relates broadly to a method for removing heat from a chemical reaction. In particular, the invention is directed to a means for removing heat from an exothermic reaction of a liquid medium.

A chemical reaction in which heat is generated is said to be an exothermic reaction. An exothermic reaction is involved in the manufacture of some polymeric materials, for example, styrene-butadiene latex. Because of this exothermic reaction there are difinite problems inherent in the latex manufacturing process.

One reason for the problem is that the butadiene monomer employed in the basic reaction has a high vapor pressure. When these materials are brought together in a reactive vessel, therefore, the rate of feed into the reactor must be fairly slow. If the feed is too rapid, the heat produced in the exothermic reaction will cause the gases in the reactor to expand very rapidly and will create a dangerous overpressure condition. Another problem is that the latex product will suffer degradation if the temperature in the reactor vessel becomes too high.

In the latex process it is not commerically feasible to carry out the reaction by feeding monomeric materials into the reactor at a slow rate. An alternative, therefore, is to find a practical way to remove heat from the reaction. One technique which has been used for heat removal involves adding a reflux condenser to the reactor vessel. The condenser used in this technique is basically a shell and tube heat exchanger. This condenser, which is referred to as the knockback design, is connected into an outlet at the top of the reactor by a short length of conduit.

A common technique for making the styrene-butadiene latex involves a process referred to as an emulsion polymerization reaction. For this reaction the starting material which is charged to the reactor vessel is a suspension of latex seed particles in a water medium. Over a period of from about two and a half hours to seven hours an aqueous mix and a monomer mix are added to the latex solution, with continuous agitation of the mix. Ingredients of the aqueous mix include water, an initiator catalyst, a buffer, and a surfactant. The basic composition of the monomer mix is styrene, butadiene and a chain transfer agent.

To avoid the overpressure condition, and the possibility of product degradation, as mentioned above, the objective is to keep the temperature in the reactor at a specific set point, usually between about 80° C. to 100° C. This is achieved by condensing butadiene, which is vaporized by the heat of reaction. To explain further, since the butadiene will boil at the temperature and pressure conditions in the reactor, the vapors can be condensed by passing them directly from the reactor into the condenser. When the butadiene vapors condense in the tube bundle in the heat exchanger, the resulting liquid flows directly back into the reactor vessel to cool the reaction mass.

The knockback condenser, however, has certain disadvantages which make it unsuitable for use in the latex process. For example, several materials enter the reactor, along with the monomer mix, which are not condensible at the reaction temperatures and pressures. These noncondensibles include gases such as methane, butenes and nitrogen, which are carried into the condenser along with the butadiene vapor. It is necessary, therefore, to periodically remove the noncondensible gases from the condenser. If this is not done the gases will accummulate in the tube bundle and seriously reduce the heat transfer capability of the condenser.

The noncondensible gases are removed from the condenser by frequent venting through a header section located above the tube bundle. However, the act of venting the noncondensible gases, and the condensing of the butadiene vapors, causes the pressure in the tube bundle of the condenser to drop considerably below the pressure in the reactor vessel. This pressure differential provides a substantial driving force which permits some of the latex emulsion to surge upwardly from the reactor through the short entry conduit and into the tube bundle of the condenser. Since the latex emulsion is an extremely sticky material, it will readily adhere to the walls of the tubes of the condenser. In a short time the latex buildup on the tubes will seriously impair the heat transfer capability of the condenser. As a result, the condenser must be frequently cleaned to prevent it from completely plugging with the latex material.

SUMMARY OF THE INVENTION

The method of this invention concerns removal of heat from an exothermic reaction. As a specific application, the method is useful for removing heat from an exothermic reaction of liquids. The basic apparatus employed in this method includes a reactor vessel equipped with a condenser unit. The condenser unit includes a header section, a vent means in the header section, and a tube bundle positioned below the header section. A shell section surrounds the tube bundle and a collector section is defined below the tube bundle. An entry conduit connects an outlet in the reactor with the header section. In addition, a return conduit connects the collector section of the condenser to the reactor outlet.

In this method the liquid mixture to be reacted is placed in the reactor vessel. During the exothermic reaction which takes place, a vapor phase is generated in the reactor which comprises a mixture of gases. From the reactor outlet the gaseous mixture is directed through the entry conduit and through the header section and into the tube bundle of the condenser. A fluid, such as water, is passed through the shell section of the condenser to cool the vapor phase. The cooling fluid brings the temperature of the vapor phase down to a point at which some of the gases will condense to a liquid. The liquid phase flows out of the tube bundle, through the collector section, and back into the reactor vessel through the return conduit. At the same time, the noncondensible gases are vented to the atmosphere through the vent means in the header section of the condenser.

DESCRIPTION OF THE DRAWING

The single FIGURE shown herein is a schematic drawing, partly in section, illustrating a reactor vessel and condenser used in the practice of the invention.

DESCRIPTION OF A PREFERRED EMBODIMENT

In the drawing the numeral 10 indicates a typical reactor vessel, which contains a liquid mixture 11 to be reacted. A jacket space 12, which contains a heat transfer fluid, such as water, encloses the reactor 10. At the top of reactor 10 is an outlet 13. The reactor 10 is equipped with a condenser unit 14, as a means for condensing vapors produced in the reaction mixture 11.

The condenser unit 14 is a conventional shell and tube heat exchanger, which has certain modifications according to the practice of this invention. One modification includes a header section 15 which is attached to the upper end of condenser 14. An entry conduit 16 connects outlet 13 of reactor 10 into the header section 15. Installed in conduit 16 above the outlet 13 is a shut off valve 17. Valve 17 is operated by a control switch (not shown). An air line 18 connects the valve into the control switch.

Header section 15 includes an inlet 19, for directing liquid into condenser 14 to flush the unit. On one side of header section 15 is a vent line 20 which opens to the atmosphere. In vent line 20 is a valve 21. Valve 21 is operated by a master temperature regulating controller (not shown). An air line 22 connects the valve 21 into the controller. Inside the condenser 14 is a tube bundle, defined by spaced apart tubes, as indicated at 23. Each of the tubes 23 is fastened at its upper and lower end into a tube sheet, which fits crosswise in condenser 14.

In the drawing only the upper tube sheet is shown, as indicated at 24. A vertical baffle plate 25 is positioned off center within the header section 15. The top edge of plate 25 (not shown) fastens to the top wall of header section 15, and the bottom edge fastens into tube sheet 24. Inside condenser 14 the spaces which surround tubes 23 define the shell section of the condenser. An inlet 26 provides means for directing a cooling fluid into the shell section of condenser 14.

The flow of cooling fluid through inlet 26 is controlled by a valve 27. Valve 27 is operated by the same master controller which operates valve 21. An air line 28 connects the valve 27 into the master controller. Cooling fluid directed into the shell section of condenser 14 is discharged through an outlet 29. At the lower end of condenser 14 is a funnel-shaped piece, which defines a collector section 30. A shut-off valve 31 is installed in the lower part of section 30. The purpose of valve 31 is to be able to isolate the reactor 10 from condenser 14. Valve 31 is operated by the same control switch which operates the valve 17. Valve 31 is connected into the control switch by an air line 32.

A return conduit 33 connects the collector section 30 directly into the outlet 13 of reactor 10. The configuration of conduit 33 is in the form of an "S" trap. This configuration enables the conduit 33 to trap some of the liquid which passes from condenser 14 into reactor 10. The purpose of trapping the liquid is explained later in this description. Conduit 33 also includes a drain line 34, which is equipped with a drain valve 35. This enables draining the trapped liquid from conduit 33 when this is desired.

Earlier in this description it was explained that the reaction of styrene with butadiene is an exothermic reaction, which requires heat removal to obtain a satisfactory latex product. The invention can be illustrated by describing the application of the present method to the styrene-butadiene latex process. At the start of the process, after the latex solution is added to reactor 10, the master temperature regulating controller is set at a specific set point, which is usually between about 80° and 100° C. The next step is to commence heating the reactor by applying steam to the water in jacket 12.

When the temperature in the reactor reaches a point which is from about 5° to 10° C. below the set point, the operator starts feeding the aqueous mix and the monomer mix into the reactor. The reason for delaying addition of the monomer mix until the reactor reaches a temperature which is about 5-10° C. below the set point, is because of the exothermic nature of the reaction. For example, it was found that if the monomer mix was added at a lower temperature, the rapid heat buildup in the reactor would push the temperature beyond the set point. This situation is difficult to control because of a significant time lag in the transmission of a signal from a thermocouple in the reactor to the master controller.

Once the reaction of the styrene and butadiene commences, it is necessary to remove heat from the reactor to keep the temperature from exceeding the set point. Shortly after the reaction begins the valves 17 and 31 are opened and drain valve 35 is closed. This permits the butadiene vapors to pass upwardly through both the entry conduit 16 and the return conduit 33. From conduit 16 the vapors travel downwardly through header section 15 and into the tubes 23. In tubes 23 the warm vapors are condensed to a liquid by the cooler water which circulates through the shell section of the condenser.

As the liquid butadiene flows downwardly in tubes 23, it passes through the collector section and into return conduit 33. At the same time, the butadiene vapors in conduit 33 pass upwardly through collector section 30 and enter tubes 23 from the bottom of condenser 14. These upwardly directed vapors also condense to a liquid and flow back into the return conduit. In a short period of time the liquid butadiene completely fills the return conduit 33 and spill back into the reactor 10.

As explained earlier, certain noncondensible gases are carried into the condenser 14 along with the butadiene vapors. If these gases are not removed from the condenser they will prevent condensation of the butadiene vapors. The usual result is an increase in the reactor temperature which is beyond the desired set point. A primary objective, therefore, is to keep the non-condensible gases from accummulating in the condenser. The problem is alleviated by regulating the vent valve 21 with the master temperature regulating controller. Initially, the valve 21 is set to open at about 2° to 5° C. below the set point temperature. During the actual reaction, therefore, at any time the temperature in the reactor exceeds the set point, the master controller modulates valve 21 to permit the non-condensible gases to be expelled through vent line 20.

Reference is made to the problem of plugging the condenser tubes with the latex emulsion. The condenser unit employed in the method of this invention overcomes this problem. For example, in the present method the vapors leaving the reactor are forced to travel a long path through the entry conduit 16 to reach the top of the condenser unit. Understandably, when there is a pressure drop in the condenser unit, the resulting driving force in the reactor will cause the latex emulsion to surge up into the entry conduit 16. Usually this force will not be enough to carry the latex all the way to the condenser. If the latex emulsion should enter the condenser from the top, however, it still does not create a problem. In this situation the downwardly flowing liquid in the tubes will scrub the latex from the tube walls and carry it back to the reactor.

The present condenser unit also has another feature which alleviates the possibility of plugging the condenser tubes from the bottom of the condenser. This feature is provided by the liquid butadiene which is trapped in the return conduit 33. The trapped liquid forms a seal which prevents the latex emulsion from surging up into the return conduit 33 from the reactor.

In the present condenser unit the baffle plate 25 is an aid to venting of the non-condensible gases. For example, during the reaction, the pressure inside the condenser tubes which are positioned between plate 25 and vent line 20 is much lower than it is in the tubes on the other side of the baffle plate. The reason is that the tubes on the far side of the baffle plate receive the butadiene vapors and non-condensible gases directly from entry conduit 16. The non-condensible gases, therefore, have a tendency to flow up the tubes which have the lower pressure resistance and pass out through the vent line 20.

In the present method the trapped liquid in conduit 33 is drained when cooling of the reactor temperature is no longer required. This point is reached sometime after the various reactants have been fed into the reactor, that is, following completion of the exothermic reaction. After the reaction is complete the condenser 14 is flushed by directing water through the inlet 19, with valves 17 and 31 open. After the condenser is flushed out, valves 17 and 31 are closed and drain valve 35 is opened. This allows the trapped liquid in conduit 33 to drain back into the reactor 10.

The invention claimed is:

1. A method for removing heat from the exothermic reaction involved in obtaining a latex product by emulsion polymerization of styrene and butadiene, the method comprising the steps of:
   providing a reactor vessel for containing a liquid mixture, the vessel including an outlet;
   providing a condenser unit which includes a header section, a vent means in the header section, a tube bundle positioned below the header section, a shell section which surrounds the tube bundle, and a collector section which is positioned below the tube bundle;
   providing an entry conduit which connects the outlet of the reactor with the header section of the condenser;
   providing a return conduit which connects the collector section of the condenser with the outlet of the reactor, the return conduit having an S shape;
   providing a temperature control unit which has a predetermined temperature set point therein, the control unit being connected into the vent means of the condenser unit;
   placing in the reactor vessel an aqueous solution which contains latex particles, styrene, and butadiene;
   heating the aqueous solution to initiate reaction of the latex, styrene, and butadiene; the said reaction being an exothermic reaction which produces a vapor phase containing a mixture of gases which includes butadiene gas and other gases;
   directing the vapor phase from the reactor, through the reactor outlet, through the entry conduit, through the condenser header section, and into the tube bundle;
   cooling the vapor phase in the tube bundle to a temperature at which the butadiene gas will condense to a liquid phase, the other gases in the vapor phase being non-condensable at this temperature;
   passing the liquid butadiene from the tube bundle of the condenser, through the collector section, through the return conduit, and into the reactor vessel; the liquid butadiene thereby cooling the aqueous solution in the reactor vessel;
   continuously trapping some of the liquid butadiene in the S shaped return conduit; the liquid forming a seal which blocks the vapor phase in the reactor outlet from entering the return conduit;
   continuously monitoring the temperature in the reactor through the temperature control unit, the temperature control unit causing the vent means to open and thereby discharge the non-condensable gases from the condenser when the temperature in the reactor vessel exceeds the temperature set point in the temperature control unit, the temperature control unit further causing the vent means to close when the temperature in the reactor vessel drops below the temperature set point in the temperature control unit.

* * * * *